(12) United States Patent
Ramakrishnan et al.

(10) Patent No.: US 7,352,801 B2
(45) Date of Patent: Apr. 1, 2008

(54) SELECTING ONE OF MULTIPLE ANTENNAS TO RECEIVE SIGNALS IN A WIRELESS PACKET NETWORK

(75) Inventors: Sthanunathan Ramakrishnan, Bangalore (IN); Ganesan Thiagarajan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 741 days.

(21) Appl. No.: 10/708,552

(22) Filed: Mar. 10, 2004

(65) Prior Publication Data

US 2004/0179495 A1    Sep. 16, 2004

Related U.S. Application Data (60) Provisional application No. 60/454,862, filed on Mar. 13, 2003.

(51) Int. Cl.
    *H04B 1/00* (2006.01)
(52) U.S. Cl. .................. 375/150; 375/345; 375/347
(58) Field of Classification Search ............. 375/347
    See application file for complete search history.

(56) References Cited

U.S. PATENT DOCUMENTS

| 4,291,410 A * | 9/1981 | Caples et al. .......... 375/345 |
| 5,999,561 A * | 12/1999 | Naden et al. .......... 375/142 |
| 6,085,076 A * | 7/2000 | Lindsay et al. ......... 455/277.1 |
| 6,141,392 A * | 10/2000 | Hoshikuki et al. ....... 375/347 |
| 6,420,934 B1 * | 7/2002 | Butler et al. .......... 330/279 |
| 7,099,380 B1 * | 8/2006 | Feng et al. ........... 375/150 |
| 2003/0026366 A1 * | 2/2003 | Matsui et al. .......... 375/347 |
| 2003/0169706 A1 * | 9/2003 | Poegel et al. .......... 370/334 |

OTHER PUBLICATIONS

Stuber, Gordon L.; Principles of Mobile Communication, 2002, Springer US, Second Edition, pp. 276-289.*
Stuber, Gordon L.; Entitled "Mobile Communication systems"; Principles of Mobile Communication Second Edition; pp. 276-289;(10 Pages).

* cited by examiner

*Primary Examiner*—Shuwang Liu
*Assistant Examiner*—David Huang
(74) *Attorney, Agent, or Firm*—Steven A. Shaw; W. James Brady; Frederick J. Telecky, Jr.

(57) ABSTRACT

Selecting one of multiple antennas to receive signals in a wireless packet network. Correlation value and gain needed to boost the signal up to a desired power (or the signal strength of the received signal) are determined for each antenna by examining the non-payload portion (e.g., preamble) of the packet. The antenna with the best SNR is then chosen based on the rule given. In an embodiment, the correlation value is determined based on the Barker Sequence employed for each bit in the preamble. The selection may be performed for each data packet, thereby using the antenna receiving the signal most conducive to recovery of the data bits (including payload) in each data packet.

16 Claims, 4 Drawing Sheets

$$\begin{cases} (1) \ 1/K < \sigma_1^2/\sigma_2^2 < K \\ (2) \ x_k = s_k \ b \\ (3) \ y_{1,k} = \sqrt{G_1}(\alpha_1 x_k + n_{1,k}) \\ (4) \ y_{2,k} = \sqrt{G_2}(\alpha_2 x_k + n_{2,k}) \\ (5) \ G_i = \dfrac{P}{|\alpha_i|^2 + \sigma_i^2} \\ (6) \ \phantom{G_i} = \dfrac{P}{\sigma_i^2(1+\rho_i)} \\ (7) \ |b^H y_{i,k}|^2 = G_i[|\alpha_{i,k}|^2 |s_k|^2 N^2 + |b^H n_{i,k}|^2 + 2Re(b^H n_{i,k} N \alpha_{i,k}^* s_k^*)] \end{cases}$$

FIG. 4A $$\begin{cases} (8) \ |b^H y_{i,k}|^2 = \dfrac{\rho_i}{1+\rho_i} N^2 P + 2\Re\left(\dfrac{b^H n_{i,k}}{\sigma_i} \dfrac{\alpha_{i,k}^* s_k^*}{\sigma_i} \dfrac{NP}{1+\rho_i}\right) \\ \phantom{(8)} \quad + \left|\dfrac{b^H n_{i,k}}{\sigma_i}\right|^2 \dfrac{P}{1+\rho_i} \\ (9) \ P([C_1,C_2,G_1,G_2]/\rho_1 > \rho_2) = \int_{\rho_2=0}^{\infty}\int_{\rho_1=\rho_2}^{\infty} f(C_1,C_2,G_1,G_2/\rho_1,\rho_2,\sigma_1^2,\sigma_2^2) \\ \qquad f(\rho_1,\rho_2) f(\sigma_1^2,\sigma_2^2) \, d\rho_1 d\rho_2 \, d\sigma_1^2 d\sigma_2^2 \\ (10) \ P([C_1,C_2,G_1,G_2]/\rho_1 > \rho_2) = \int_{\rho_2=0}^{\infty}\int_{\rho_1=\rho_2}^{\infty} f(C_1/\rho_1) f(C_2/\rho_2) \\ \quad f(G_1,G_2/\rho_1,\rho_2,\sigma_1^2,\sigma_2^2) f(\rho_1,\rho_2) f(\sigma_1^2,\sigma_2^2) \, d\rho_1 d\rho_2 \, d\sigma_1^2 d\sigma_2^2 \\ (11) \ f(G_1,G_2/\rho_1,\rho_2,\sigma_1^2,\sigma_2^2) = \delta\left(G_1 - \dfrac{P}{\sigma_1^2(1+\rho_1)}, G_2 - \dfrac{P}{\sigma_2^2(1+\rho_2)}\right) \\ (12) \ \phantom{f(G_1,G_2/\rho_1,\rho_2,\sigma_1^2,\sigma_2^2)} = \delta\left(\sigma_1^2 - \dfrac{P}{G_1(1+\rho_1)}, \sigma_2^2 - \dfrac{P}{G_2(1+\rho_2)}\right) \end{cases}$$

FIG. 4B $$(13) \quad a < \frac{P}{G_1(1+\rho_1)} < b$$

$$(14) \quad a < \frac{P}{G_2(1+\rho_2)} < b$$

$$(15) \quad \rho_1 > \rho_2$$

$$(16) \quad \rho_1, \rho_2 > 0$$

$$(17) \quad \int_{\frac{P}{\max(G_1,G_2)a}-1}^{\frac{P}{aG_1}-1} \int_{\rho_2=\max(\frac{P}{bG_2}-1,0)}^{\rho_1=\max(\frac{P}{bG_1}-1,\rho_2)} f(C_1/\rho_1)\, f(C_2/\rho_2)\, \frac{1}{(b-a)^2}\, f(\rho_1,\rho_2)\, d\rho_1 d\rho_2 +$$

$$\int_{\frac{P}{\max(G_1,G_2)a}-1}^{\frac{P}{aG_1}-1} \int_{\rho_2=\max(\frac{P}{bG_2}-1,0)}^{\rho_1=\max(\frac{P}{bG_1}-1,\rho_2)} f(C_1/\rho_1)\, f(C_2/\rho_2)\, f(\rho_1,\rho_2)\, d\rho_1 d\rho_2 +$$

$$(18) \quad \int_{\frac{P}{\max(G_1,G_2)a}-1}^{\frac{P}{aG_2}-1} \int_{\rho_1=\max(\frac{P}{bG_1}-1,0)}^{\rho_2=\max(\frac{P}{bG_2}-1,\rho_1)} f(C_1/\rho_1)\, f(C_2/\rho_2)\, f(\rho_1,\rho_2)\, d\rho_1 d\rho_2$$

$$\int_{\frac{1}{\max(g_1,g_2)}-1}^{\frac{1}{g_1}-1} \int_{\rho_2=\max(\frac{1}{g_2K}-1,0)}^{\rho_1=\max(\frac{1}{Kg_1}-1,\rho_2)} f(C_1/\rho_1)\, f(C_2/\rho_2)\, f(\rho_1,\rho_2)\, d\rho_1 d\rho_2 +$$

$$(19) \quad \int_{\frac{1}{\max(g_1,g_2)}-1}^{\frac{1}{g_2}-1} \int_{\rho_1=\max(\frac{1}{Kg_1}-1,0)}^{\rho_2=\max(\frac{1}{Kg_2}-1,\rho_1)} f(C_1/\rho_1)\, f(C_2/\rho_2)\, f(\rho_1,\rho_2)\, d\rho_1 d\rho_2$$

*FIG. 4C*

505 — If (g2/g1) > T1, then select Antenna 160

510 — else if (g2/g1) < (1/T1), then select Antenna 150

515 — else if (g2/g1) > 0, then

520 — If C1 ∉ [$\mu_\infty$ -c1(g2/g1)-m1(g2/g1)*g2dB, $\mu_\infty$ +c1(g2/g1)+m1(g2/g1)*g2dB] &
C2 ∈ [$\mu_\infty$ -c2(g2/g1)-m2(g2/g1)*g2dB, $\mu_\infty$ +c2(g2/g1)+m2(g2/g1)*g2dB],
then select Antenna 160

525 — else select Antenna 150 end if

530 — else if g2/g1 < 0 then

535 — If C2 ∉ [$\mu_\infty$ -c2(g2/g1)-m2(g2/g1)*g2dB, $\mu_\infty$ +c2(g2/g1)+m2(g2/g1)*g2dB] &
C1 ∈ [$\mu_\infty$ -c1(g2/g1)-m1(g2/g1)*g2dB, $\mu_\infty$ +c1(g2/g1)+m1(g2/g1)*g2dB]
then select Antenna 150

540 — else select Antenna 160, end if

550 — else if g2 < T2

555 — If $(C1 - \mu_\infty)^2 - (C2 - \mu_\infty)^2 < 0$, then select Antenna 150

560 — else select Antenna 160, end if

570 — else if C1 > C2 then, select Antenna 150

580 — else select Antenna 160, end if

*FIG. 5*

SELECTING ONE OF MULTIPLE ANTENNAS TO RECEIVE SIGNALS IN A WIRELESS PACKET NETWORK

CROSS REFERENCE TO RELATED APPLICATIONS

The present application is related to and claims priority from the now abandoned U.S. Provisional Patent Application Ser. No.: 60/454,862, entitled, "Optimal Algorithm for Antenna Selection Diversity in IEEE 802.11b/g Wireless Networks@, filed on Mar. 13, 2003, naming as inventors: RAMAKRISHNAN et al, and is incorporated in its entirety herewith.

BACKGROUND OF INVENTION

1. Field of the Invention

The present invention relates to wireless communications, and more specifically to a method and apparatus for selecting one of multiple antennas to receive signals in a wireless packet network.

2. Related Art

Data packets are often transmitted using wireless technologies. For example, a stream of bits representing voice may be transmitted in the form of packets using standards such as CDMA. In general, a packet contains a payload portion representing the data of interest to be transported, and a non-payload portion (containing subportions such as preamble, postamble, midamble, training sequences).

A typical sending system transmits each packet in several directions (angles). Each transmitted signal may be bounced (reflected) by several surfaces present in a corresponding path before reaching a receiving system. Before reaching the receiving system, each reflected signal may undergo different degrees of attenuation, phase rotations and be subject to different noise levels depending on various factors as is well known in the relevant arts.

A receiving system may employ multiple antennas to receive packets. In general, multiple antennas are employed such that at least one of the antennas is located in a path of a signal which is more conducive (e.g., high strength/amplitude) for the recovery of the encoded data, and it is generally desirable that the signal received by such an antenna (in the path of the strong signal) be examined to recover the encoded bits of the packet.

In situations where only two antennas are used, the two antennas may be separated by a distance of $\lambda/2$, wherein $\lambda$ represents the wavelength corresponding to frequency of operation of the communication system. Accordingly, there is a general need to select one among multiple antennas when receiving a packet using wireless technologies.

BRIEF DESCRIPTION OF DRAWINGS

The present invention will be described with reference to the following accompanying drawings.

FIGS. 4A, 4B, and 4C contain equations forming part of the theoretical background for a selection approach employed in an embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A receiver implemented according to an aspect of the present invention processes a signal received on each antenna to determine multiple parameters associated with the corresponding antenna, and selects one of the antennas based on the parameters. In one embodiment, the parameters determined for each antenna include the strength of the signal received from the antenna and a correlation value representing the similarity of a portion of a received signal with an expected signal according to a pre-defined protocol.

In an implementation described below, the expected signal corresponds to a Barker Sequence (well known in the relevant arts), and a digital value (representing discrete signal levels) generated from the portion of the received signal is compared with the Barker sequence to determine the correlation value.

By using such multiple parameters to select among antennas, the antenna receiving a signal most conducive to recovery (with high SNR) of the encoded data may be selected. The above approach of selecting an antenna may be repeated for receiving each packet since the determination of the specific antenna may be performed based on the preamble of each packet.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the invention.

2. Example Environment

Figure 1:
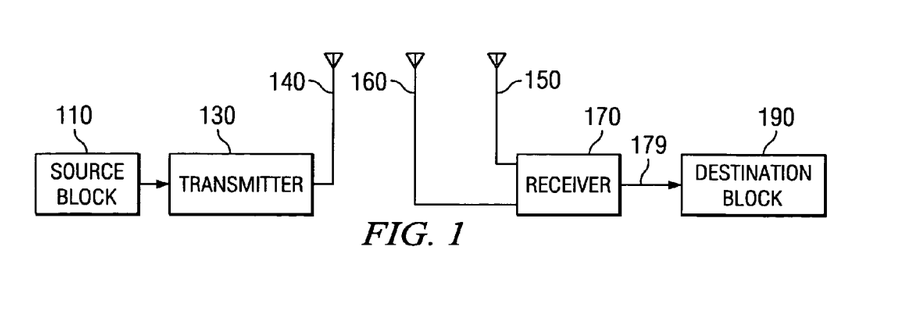
FIG. 1 is a block diagram illustrating the details of an example environment in which present can be implemented.

FIG. 1 is a block diagram illustrating the details of an example environment in which the present invention can be implemented. The environment is shown containing source block 110, transmitter 130, transmitting antenna 140, receiving antennas 150 and 160, receiver 170, and destination block 190. Each block is described below in further detail.

The environment is shown containing only a few representative components for illustration. However, typical environments contain many such components and such environments are also contemplated to be within the scope and spirit of various aspects of the present invention. In addition, merely for conciseness, the description is provided with reference to two receiving antennas only. However, more than two antennas may be used without departing from the scope and spirit of various aspects of the present invention, as will be relevant to one skilled in the relevant art by reading the disclosure provided herein.

Source block 110 may contain (e.g., execute) applications generating data bits destined to destination block 190. Destination block 190 receives the data bits on path 179 via transmitter 130 and receiver 170. Similarly (even though not illustrated in the drawing, in the interest of conciseness), destination block 190 may send data packets to source block 110. The data bits thus exchanged can form the basis for various user applications. Source block 110 and transmitter 130 together form a sender system, and receiver 170 and destination block 190 form a receiver system in the depicted scenario.

Transmitter 130 receives a sequence of data bits from source block 110, and transmits the received bits in the form of packets according to a pre-specified wireless technology (e.g., direct sequence spread spectrum (DSSS)). Each packet may be encoded in multiple signals/samples which are transmitted in all directions. Transmitter 130, source block 110, and destination block 190 may be implemented in a known way.

Receiver 170 is shown connected to multiple antennas (150 and 160), and selects the signal received on one of the antennas to recover the data bits transmitted by transmitter 130. The recovered bits are provided on path 179. In general, receiver 170 selects one of several available antennas based on multiple parameters characterizing each signal received by a corresponding antenna as described below in more detail with respect to several examples.

3. Method

Figure 2:
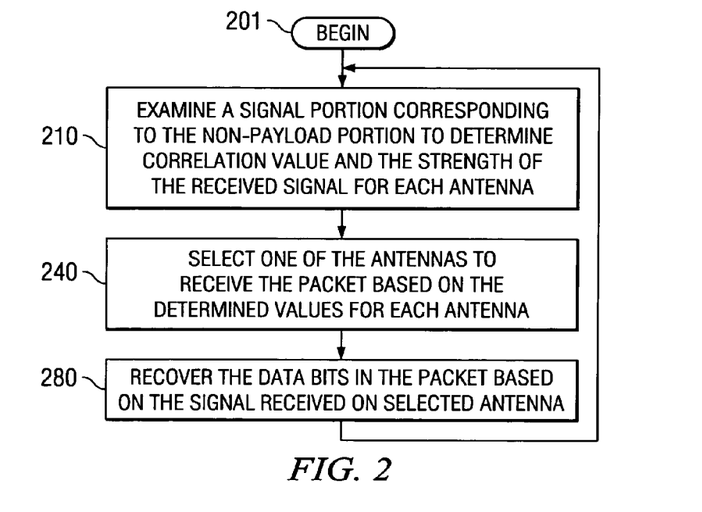
FIG. 2 is a flow-chart illustrating the details of a method using which one of multiple antennas receiving a signal in a wireless packet network may be selected according to an aspect of the present invention.

FIG. 2 is a flow-chart illustrating the details of a method using which a receiver may select one of multiple antennas according to an aspect of the present invention. The method is described with reference to FIG. 1 merely for illustration. However, the method may be implemented in other environments as well. The method begins in step 201, in which control immediately passes to step 210.

In step 210, receiver 170 examines a signal portion corresponding to a non-payload portion to determine the strength of the received signal, and a correlation value for each of the antennas 150 and 160. Here the strength of the signal received on each antenna measures the power/energy due to the desired signal and receiver noise and it may be determined using one of several known approaches. The correlation value represents the similarity of a portion of a received signal with an expected signal according to a pre-defined protocol.

As is well known, many wireless standards (e.g., IEEE 802.11b) provide a preamble associated with each packet. The preamble generally enables the receivers to synchronize the sampling points and perform various other adjustments (e.g., determining an amplification factor using automatic gain control (AGC) to accurately recover the data bits that follow the preamble). As described in further detail below, in an example embodiment, the gain factor is used to determine the strength of the signal received on each antenna, and the Barker Sequence in the preamble is used to determine the correlation values. While the description is provided with reference to examining the preamble portion of a received packet, it should be appreciated that other non-payload portions may also be examined to select the appropriate antenna according to various aspects of the present invention.

In step 240, receiver 170 selects the antenna to receive the packet based on the parameters (values) determined for each antenna. In general, an antenna receiving the signal with high signal strength and "good" correlation values is considered to be more conducive to recover the data. The manner in which the two parameters can be used in selecting an antenna is described in sections below with examples.

In step 280, receiver 170 recovers the remaining data bits in the packet based on the signal received on the selected antenna. Steps 210 through 280 may be repeated for each packet. Thus, the approach of FIG. 2 can be used to employ multiple antennas and recover data bits of a packet from an antenna receiving a signal potentially most conducive to recovery. The description is continued with reference to details of additional embodiments of receiver 170.

4. Receiver

Figure 3:
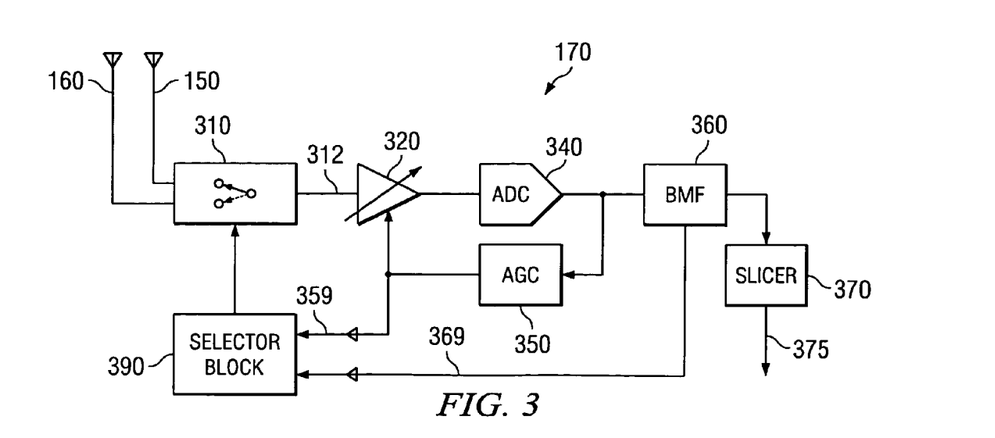
FIG. 3 is a block diagram illustrating the details of an embodiment of a receiver block implemented according to an aspect of present invention.

FIG. 3 is a block diagram illustrating an embodiment of receiver implemented according to an aspect of present invention. Receiver 170 is shown containing switch 310, variable gain amplifier 320, analog-to-digital converter (ADC) 340, automatic gain control block (AGC) 350, Barker matching filter (BMF) 360, slicer 370, and selector block 390. Each block is described below in further detail.

Selector block 390 causes switch 310 to connect either antenna 150 or antenna 160 to path 312.general, when a preamble for a packet is being received, selector block 390 selects each one of the antennas to measure the corresponding parameters defined above. A specific one of the antennas is then selected as being most conducive to recover the data in the payload portion. When the remaining part of the data packet (including payload) is being later received, the selected antenna is caused to be connected to path 312.

With respect to the selection of the specific one of the antennas, in an embodiment implemented using IEEE 802.11b/g standard, while receiving preamble, selector block 390 first connects one of the two antennas 150 and 160 to path 312, and measures the correlation values and strength (example "parameter values") of the signal being received on the connected antenna. Selector block 390 then connects the other antenna to measure the related parameter values. One of the two antennas is then selected for receiving the packet data based on the measured parameter values.

Amplifier 320 filters and amplifies the signal received on path 312. The degree of amplification is determined by an amplification factor received from AGC 350. The amplification factor is generally set to a value such that the full range of ADC 340 is used. Though shown as one unit, amplifier 320 may contain a series of amplifier and frequency selective filter circuit combination to remove various undesirable components present along with the base band signal (transmitted signal). Amplifier 320 may be implemented in a known way. Switch 310 connects either antenna 150 or antenna 160 to path 312 under the control of selector 390, and may be implemented in a known way.

AGC 350 examines the output of ADC 340 when the preamble is being received, and determines the amplification factor. In general, if the signal at the input of the receiver is of lower strength, then higher amplification factor is required to amplify the signal to a desired level. As noted above, the respective amplification factor may be determined for the signals received on both antennas 150 and 160, and provided to selector block 390. Once one of the antennas is selected, the associated amplification factor is provided to amplifier 320. AGC 350 (including the storage required to store the amplification factors) may also be implemented in a known way.

ADC 340 samples the signal received from amplifier 320 to generate sampled data elements. In an embodiment, each sampled data element comprises multiple bits, which are passed to BMF 360 for further processing. ADC 340 may be implemented in a known way.

BMF (Barker match filter) 360 generates a correlation value associated with each data bit in the received signal. As is well known and described in IEEE 802.11b/g standard, transmitted signal equals the 11 sample sequence $\{1, -1, 1, 1, -1, 1, 1, 1, -1, -1, -1\}$ (Barker sequence) when a data bit of 1 is to be encoded, and {−1, 1, −1, −1, 1, −1, −1, −1, 1, 1, 1} (negation of Barker sequence) when a data bit of 0 is to be encoded. The pre-amble associated with each packet also encodes a sequence of bits. Thus, by examining the 11-bit code generated associated with each antenna, the corresponding correlation values may be generated.

While the embodiments here are described with reference to Barker sequences merely for illustration, it should be understood that alternative implementations may be provided using any spread sequences (e.g., as in DS-CDMA) well known in the relevant arts. In such a situation, a corresponding matching filter needs to be generally implemented. Such implementations are contemplated to be covered by various aspects of the present invention.

BMF filter 360 generates a correlation value corresponding to each data bit received. In the embodiment of FIG. 3, the correlation value represents a count indicating the number of matching bits less the number of non-matching bits for the code corresponding to a data bit of 1. A correlation value of +11 indicates that a data bit of 1 is received, and a correlation value of −11 indicates that a data bit of 0 is received.

It should be understood that BMF filter 360 merely represents an example component implementing an example approach to generating a correlation value. Correlation values may be determined using other techniques/approaches. For example, instead of using digital values (or discrete levels) as described above, comparison can be performed on analog signals. Such implementations will be apparent to one skilled in the relevant arts by reading the disclosure provided herein, and are contemplated to be covered by various aspects of the present invention.

The correlation values may be used for selecting the antenna and the value of the bit. In one embodiment, the amplification factor determined by AGC 350 is also used as another factor in determining the received signal strength. In general, BMF filter 360 and AGC 350 together represent an example parameters generation block, which determines various parameters used to select the specific one of the available antennas.

Slicer 370 generates data bits from the correlation values received from BMF 360. In an embodiment, a value of 1 is deemed to be present for a positive correlation value (+1 through +11) and a 0 is deemed to be present for a negative correlation value (−1 to −11). The digital bits thus generated are transferred on path 179 to destination block 190. While slicer 370 is described as recovering a single bit each time, it may be appreciated that the received signal may contain multiple bits, and implementation of such extensions will be apparent to one skilled in the relevant arts by reading the disclosure provided herein.

In addition, components such as filter 320, ADC 340 and BMF 360 are shown following switch 310, which generally reduces the overall cost of implementation (since the components following the switch are shared by all antennas). However, alternative embodiments may be implemented in which some or all of such components are before switch according to various aspects of the present invention.

As noted above, selector block 390 needs to select one of the antennas, which is receiving a signal most conducive (high SNR, generally) to accurate recovery of data bits. The general theoretical basis (in an embodiment) for selecting an antenna receiving a signal conducive for recovery is described below 5. Theoretical Background For purposes of understanding the theoretical background, it is assumed that $\alpha_i$ is the attenuation of the signal received in the $i^{th}$ antenna and $n_i$ is the noise of variance $\sigma^2_i$, added to the signal received from the $i^{th}$ antenna (for illustration, only two antennas 150 and 160 are considered). The different noise powers may be modeled on the two antennas (150 and 160) by assuming that $\sigma_i^2$s are independent and uniformly distributed in [a, b], wherein a, b>0. A factor K may be defined to equal $^b/_a$. The ratio of the noise variances obeys the boundary condition represented by Equation (1) of FIGS. 4A, 4B and 4C (collectively referred to as FIG. 4 in the description below).

The gain $G_i$ (provided by amplifier 320, controlled by AGC 350) gains up the in-band signal and the corresponding noise to a desired set point for the $i^{th}$ antenna. It may be assumed that the antennas are well separated and the signals received on the two antennas 150 and 160 undergo independent fades.

The symbol $s_k$ is spread by the Barker sequence of length N and can be represented in vector notation as shown in Equation (2) of FIG. 4, wherein b represents the Barker sequence in vector notation.

The signal ($y_{1,k}$ and $y_{2,k}$) at the output of AGC 350 corresponding to signal (represented symbol $x_k$ of Equation (2)) received by antennas 150 and 160 is as shown respectively in Equations (3) and (4) of FIG. 4, wherein $\alpha_i$ represents the channel gain for the $i^{th}$ (equals 1 and 2 corresponding to antennas 150 and 160) path, $n_{i,k}$ represents the noise vector received at the $i^{th}$ antenna for $k^{th}$ symbol and is of N(=11 in the example above) chip duration (time duration for each of 11 pulses in the illustrative example) and $G_i$ (or $AGC_i$) is the power gain given by the AGC 350 for the signal from the $i^{th}$ antenna.

Noise is assumed to be additive white Gaussian noise (AWGN) and has the probability density function (PDF) $N(0,\sigma^2_i)$ in the $i^{th}$ antenna. Symbol $s_k$ is got from a PSK constellation. AGC 350 sets the amplifier's power gain such that the amplifier (320) output has power equal to P and the power gains of the $i^{th}$ antenna is as shown in Equation (5) of FIG. 4. Power gain of Equation (5) may be re-written resulting in Equation (6) that follows from the definition of SNR.

The signal after amplification (by amplifier 320) is passed to the Barker matched filter (BMF 360), the output of which is sampled appropriately to get the peak of the correlation. Since the phase of $s_k$ is unknown (as, the exact position of the bit being accessed in the header (pre-amble) is not known), the power at the output of BMF 360 may be examined and is represented by Equation (7) shown in FIG. 4. Substituting for $G_i$ (from Equation (6)) in Equation (7), the resulting Equation (8) is also shown in FIG. 4.

The sum of the first two terms in the RHS of Equation (8) is a Gaussian random variable having a distribution of N $((\rho_i/1+\rho_i)N^2P, 2N^3P^2(\rho_i/(1+\rho_i)^2))$ and the third term is (chi-squared) $X^2$ distributed with mean and standard deviation of the $X^2$ process being $NP/1+\rho_i$. The ratio of the variances of the variances of the Gaussian process to the $X^2$ process is 2Nρ, wherein N=11 for the barker sequence. It implies that at reasonably high SNRs (say ρ>−3db), $X^2$ noise process may be neglected. The $X^2$ process may be approximated by its mean and thus, the correlation power, given the SNR, is distributed as N $((N\rho_i+1/1\rho_i) NP, -2N^3P^2 (\rho_i/1+\rho_i)^2))$.

Thus, a mathematical signal model of receiver 170 may be modeled. The description is continued with reference to selection of an antenna using such a model.

6. Optimal Antenna Selection

The basis for selecting an antenna with the higher SNR, given the corresponding correlation values and AGC gains of both the antennas (150 and 160), is described below. As both antennas 150 and 160 are equally likely to have a good/acceptable SNR (thereby being conducive to recovering the data bits), the optimal rule is the Maximum-Likelihood (ML) criterion (well-known in the relevant arts), according to which antenna 150 may be selected, if the condition below is satisfied, otherwise antenna 160 may be selected.

$$P([C1;C2;G1;G2]/\rho1>\rho2) > P([C1;C2;G1;G2]/\rho2>\rho1) \qquad (8A)$$

Although strength of the signal received by an antenna can be represented as a Rayleigh or Rician random variable (both well known in the relevant arts) and the parameters of the process at the receiver are usually not known. Only $\rho_i$; $vi=1; 2$ is i.i.d (independent and identically distributed) may be assumed at the receiver. Now the left hand side (LHS) of the Equation (8A) can be written as shown in Equation (9) of FIG. 4.

Now given the SNRs, the correlations and the gains are independent of one another. From this property and Equation (6), the LHS of Equation (8A shown above) can be written as shown in Equation (10) of FIG. 4, wherein $f_{(x)}(x/a)$ represents the conditional PDF of the random variable x given a. Given $\rho_1, \rho_2, \sigma^2_1$ and $\sigma^2_2$, $G_1$ and $G_2$ are deterministic (from Equation (6)) it may be understood that the corresponding PDF is a 2-d delta function.

For $\rho_1 > \rho_2$, we need $(^{G2}/_{G1}) > (\sigma^{21}/\sigma_{22})$. From Equation (1), this is true if $(^{G2}/_{G1}) > K$ and false if $(^{G2}/_{G1}) < (^1/_K)$. If $(^{G2}/_{G1}) > K$, and $\rho_1 > \rho_2$ select antenna 150, and if $(^{G2}/_{G1}) < ^1/_K$, and $\rho_1 < \rho_2$ select antenna 160. If $(^1/_K) = < (^{G2}/_{G1}) < = K$, then from the fact that $a < \sigma^2_1, \sigma^2_2 < b$, the boundary conditions corresponding to $\rho_1$ and $\rho_2$ for LHS may be represented by Equations (13), (14), (15) and (16) shown in FIG. 4.

Simplifying the constraints, the LHS may be written as shown in Equation (17) of FIG. 4. Similarly, simplifying the right hand side (RHS), the ML rule (when $(^1/_K) = < (^{G2}/_{G1}) < = K$) is as shown in Equation (18) of FIG. 4.

In order to simplify this expression, let $G_{max} = ^P/_a$, then $^P/_b = ^{Gmax}/_K$ and let $g_1 = ^{G1}/_{GmaxK}$ and $g_2 = ^{G2}/_{GmaxK}$, then $^{G1}/_{G2} = ^{g1}/_{g2}$. Then Equation (18) may be written as shown in Equation (19) of FIG. 4.

As there is no closed form for the integral shown in Equation (19), numerical integration approaches may be applied. In one embodiment, the range of SNR that may be considered equals 0 to 30 dB. It is assumed that the SNRs are uniform over this range (0 to 30 dB). The corresponding integrals may be evaluated numerically.

The optimal ML rule may need to be implemented as a huge table with entries for different possible correlation and gain values. In one embodiment, by observing the table values, the following approach (of FIG. 5) was determined to be the optimal approach, and accordingly the selection may be implemented according to the corresponding logic. In the approach described below, various variables/functions m1, m2, c1 and c2 are used. These variables/functions may be determined while developing the approach, and the specific values generally depend on the value of K.

Assuming for illustration that K=6 dB and that T1=1dB and T2=−7 dB. For g2/g1=+1 dB, we get m1 (1)=13.75, m2 (1)=1:5, c1 (1)=441 and c2 (1)=47. From this it may be observed that only for very low values of g, do we get a range where antenna 160 is selected. As the value of g increases, the range decreases and antenna 150 is selected. This is because low g corresponds to a higher SNR (all possible values of SNR are "high") and the correlations are expected to be around $\mu_\infty$.

Thus, if C1 is away from $\mu_\infty$ and C2 is close to $\mu_\infty$, antenna 160 is selected. But as the gain increases, the SNR decreases and the spread of the correlation values increases. Hence antenna 160 is selected if C1 is more away from $\mu_\infty$ than C2 is closer to it. This is reflected in the fact that m1 is substantially greater that m2 in the above example. As g increases even further, the confidence on the correlation values falls rapidly and hence antenna 160 is selected, just on the basis of g2=g1=1. For the case of g2=g1=−1 dB, similar results are attained, and that m1(−1)=1.25, m2(−1)= 17, c1(−1)=45:5 and c2(−1)=540.

The analysis provided above is simplified to provide the following implementation described with reference to FIG. 5 below.

7. Implementation

Figure 5:
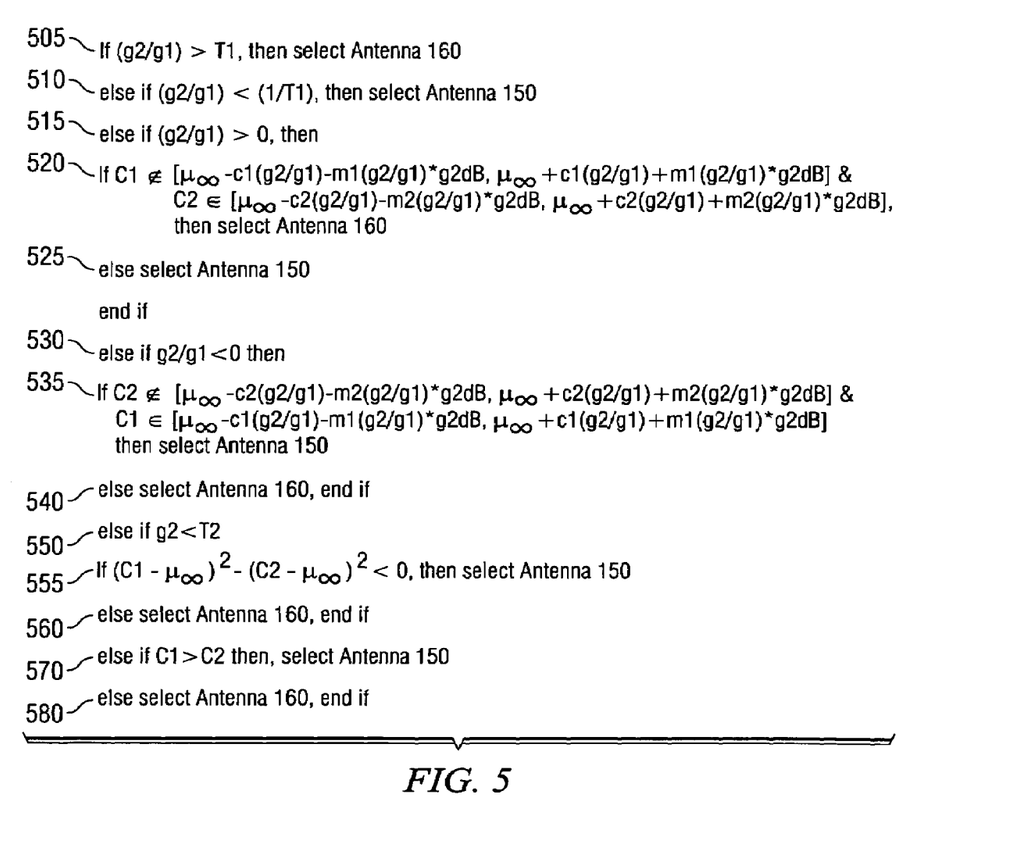
FIG. 5 is a diagram illustrating the program logic based on which a selector block selects an antenna receiving signal more conducive for recovery in one embodiment.

FIG. 5 contains lines 505-580 illustrating the manner in which selector block 390 maybe implemented to select either antenna 150 or 160 depending on the values of two measured parameters. The values of AGC1, AGC2, C1, and C2 noted above may be provided to selector block 390. The mean (mu) of the Gaussian distribution of correlation values may be determined as equaling N2×P (wherein N=11 if a 11-bit Barker sequence is used as a preamble, and P is the power output of amplifier 320). The values of T1, T2, m1, m2, c1, and c2 may be determined/estimated and provided (stored) to selector block 390 prior to selection of antenna.

Selector block 390 may operate according to the instructions in lines 505-580 to select one of the two antennas. Each instruction is self-explanatory, and is not repeated here in the interest of conciseness. However, broadly, it may be observed that selector block 390 operates according to the following four rules.

Rule 1: When the difference in AGC1(in dB) and AGC2 (in dB) values is large (compared to difference in threshold T1), the selection of antenna is based on the difference in gains (correlation values may not be considered for selecting an antenna). An antenna receiving a signal requiring lower gain factor may be selected (as strength of such a signal may be higher).

Rule 2: When the absolute value of difference between AGC1 and AGC2 values is small (less than T1, but not equal to zero), the correlation values are given a large weight as long as one of them is close to $\mu_\infty$ and the other is away from $\mu_\infty$. In this case, the correlation that is close to $\mu_\infty$ has a higher SNR with a large probability and hence that antenna is selected.

Rule 3: When AGC1 and AGC2 values are equal (i.e., difference between AGC1 and AGC2 equals zero), and if AGC1 and AGC2 are high (greater than gain threshold T2), then select antenna whose correlation value is closer to $\mu_\infty$, as similar logic as Rule 2 may be applied to select one of the antennas.

Rule 4: When AGC1 and AGC2 values are equal, and if AGC1 and AGC2 are low (less than T2), an antenna receiving a signal representing higher correlation value may be selected.

Thus, an antenna receiving a signal most conducive for recovery may be selected while receiving each data packet.OLE_LINK1

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

The invention claimed is:

1. A method of receiving a packet containing a plurality of data symbols, said method being performed in a receiver connected to a plurality of antennas containing a first antenna and a second antenna, said method comprising:

generating a corresponding plurality of parameters by examining a respective signal portion received on each of said plurality of antennas, wherein said signal portion corresponds to a non-payload portion of said packet, said corresponding plurality of parameters comprising a first plurality of parameters and a second plurality of parameters respectively corresponding to said first antenna and said second antenna;

selecting one of said plurality of antennas based on said corresponding plurality of parameters; and receiving a payload portion of said packet on said one of said plurality of antennas, wherein each of said parameters has a corresponding value for each of a plurality of sub-portions of the respective signal portion received on each of said plurality of antennas, wherein a first parameter contained in each of said corresponding plurality of parameters comprises a correlation value, and a second parameter contained in each of said corresponding plurality of parameters comprises a strength of said signal, said correlation value representing the similarity of said signal portion with a corresponding expected signal according to a pre-defined protocol, wherein said generating comprises determining a gain factor necessary to amplify said signal portion to a first voltage level, wherein said strength is determined based on said gain factor, wherein said plurality of antennas comprise only said first antenna and said second antenna, wherein said gain factor for said first antenna and said second antenna is respectively represented by AGC1 and AGC2 on a dB scale, wherein T1 and T2 represent a first threshold and a second threshold, if a difference in said AGC1 and said AGC2 values is large compared to T1, selecting the antenna having a lower value of said AGC1 and said AGC2;

if the absolute value of said difference between AGC1 and AGC2 values is small, selecting one of said first antenna and said second antenna having a value close to $\mu\infty$ if the correlation value of the other one of said two antennas is away from $\mu\infty$, wherein $\mu\infty$ represents a mean of Gaussian distribution when SNR of said signal is high;

if said AGC1 and said AGC2 are equal, and if said AGC1 and said AGC2 are high, then selecting one of said first antenna and said second antenna having a correlation value closer to $\mu\infty$; and if said AGC1 and said AGC2 values are equal, and if said AGC1 and said AGC2 are low, selecting one of said first antenna and said second antenna having a higher correlation value.

2. The method of claim 1, wherein said generating generates a sequence of digital values corresponding to said signal portion, and wherein said corresponding expected signal is represented by a sequence of expected values according to a spread sequence protocol.

3. The method of claim 2, wherein said sequence of expected values comprises a spread spectrum sequence.

4. The method of claim 3, wherein said spectrum sequence comprises a Barker sequence.

5. The method of claim 1, wherein each of said plurality of sub-portions represents a corresponding one of said plurality of data symbols encoded in said signal portion.

6. A receiver for receiving a packet containing a plurality of data symbols, said receiver being connected to a plurality of antennas, said receiver comprising:

a parameters generation block generating a corresponding plurality of parameters by examining a respective signal portion received on each of said plurality of antennas, wherein each of said respective signal portion corresponds to a non-payload portion of said packet, said corresponding plurality of parameters comprising a first plurality of parameters and a second plurality of parameters respectively corresponding to said first antenna and said second antenna; and a selector block selecting one of said plurality of antennas based on said corresponding plurality of parameters, wherein a payload portion of said packet is received on said one of said plurality of antennas, wherein each of said parameters has a corresponding value for each of a plurality of sub-portions of the respective signal portion received on each of said plurality of antennas, wherein a first parameter contained in each of said corresponding plunility of parameters comprises a correlation value, and a second parameter contained in each of said corresponding plurality of parameters comprises a strength of said signal, said correlation value representing the similarity of said signal portion with a corresponding expected signal according to a pre-defined protocol, wherein said parameters generation block determines a gain factor necessary to amplify said signal portion to a first voltage level, wherein said strength is determined based on said gain factor in performing said generating, wherein said plurality of antennas comprise only said first antenna and said second antenna, wherein said gain factor for said first antenna and said second antenna is respectively represented by AGC1 and AGC2 on a dB scale, wherein T1 and T2 represent a first threshold and a second threshold, if a difference in said AGC1 and said AGC2 values is large compared to T1, selecting the antenna having a lower value of said AGC1 and said AGC2;

if the absolute value of said difference between AGC1 and AGC2 values is small, selecting one of said first antenna and said second antenna having a value close to $\mu\infty$ if the correlation value of the other one of said two antennas is away from $\mu\infty$, wherein $\mu\infty$ represents a mean of Gaussian distribution when SNR of said signal is high;

if said AGC1 and said AGC2 are equal, and if said AGC1 and said AGC2 are high, then selecting one of said first antenna and said second antenna having a correlation value closer to; and if said AGC1 and said AGC2 values are equal, and if said AGC1 and said AGC2 are low, selecting one of said first antenna and said second antenna having a higher correlation value.

7. The receiver of claim 6, wherein said parameters generation block generates a sequence of digital values corresponding to each of said respective signal portion, and wherein said corresponding expected signal is represented by a sequence of expected values according to a spread sequence protocol.

8. The receiver of claim 7, wherein said sequence of expected values comprises a Barker Sequence.

9. The receiver of claim 8, further comprising a switch coupled to all of said plurality of antennas, said switch connecting said selected one of said plurality of antennas to an end of a path under the control of said selector block.

10. The receiver of claim 9, further comprising:
an amplifier amplifying said signal portion received by said one of said plurality of antennas to generate an amplified signal;
an analog to digital converter (ADC) sampling said amplified signal to generate a sequence of sampled bits;
a match filter examining said sequence of sampled bits to generate an encoded bit.

11. The receiver of claim 10, wherein said first voltage level is determined by a range of operation of said ADC.

12. The receiver of claim 10, wherein said amplifier, said ADC and said matching filter are connected in another end of said path.

13. The receiver of claim 10, wherein said matching filter comprises a Barker match filter.

14. A device receiving a packet containing a plurality of data symbols, said device comprising:
a first antenna and a second antenna, each receiving a same signal containing a non-payload portion and a payload portion;
a receiver coupled to said plurality of antennas, said receiver comprising:
means for generating a first parameter and a second parameter by examining said non-payload portion received via said first antenna, and a third parameter and a fourth parameter by examining said non-payload portion received via said second antenna, wherein each of said first parameter and said third parameter representing a respective correlation of said non-payload portion with a corresponding expected signal, said second parameter and said fourth parameter representing a respective strength of said signal received via said first antenna and said second antenna;
means for selecting one of said plurality of antennas based on said first parameter, said second parameter, said third parameter and said fourth parameter; and
means for receiving a payload portion of said packet on said one of said plurality of antennas,
wherein said means for generating determines a gain factor necessary to amplify said signal portion to a first voltage level, wherein said strength is determined based on said gain factor,
wherein said gain factor for said first antenna and said second antenna is respectively represented by AGC1 and AGC2 on a dB scale, wherein T1 and T2 represent a first threshold and a second threshold,
if a difference in said AGC1 and said AGC2 values is large compared to T1, selecting the antenna having a lower value of said AGC1 and said AGC2;
if the absolute value of said difference between AGC1 and AGC2 values is small, selecting one of said first antenna and said second antenna having a value close to $\mu\infty$ if the correlation value of the other one of said two antennas is away from $\mu\infty$, wherein $\mu\infty$ represents a mean of Gaussian distribution when SNR of said signal is high;
if said AGC1 and said AGC2 are equal, and if said AGC1 and said AGC2 are high, then selection one of said first antenna and said second antenna having a xorrelation value closer to; and
if said AGC1 and said AGC2 values are equal, and if said AGC1 and said AGC2 are low, selecting one of said first antenna and said second antenna having a higher correlation value.

15. The device of claim 14, wherein said means for generating generates a sequence of digital values corresponding to said signal portion, and wherein said corresponding expected signal is represented by a sequence of expected values according to a spread sequence protocol.

16. The device of claim 15, wherein said sequence of expected values comprises a Barker Sequence.

* * * * *